(12) United States Patent
Siman-Tov

(10) Patent No.: US 6,625,148 B1
(45) Date of Patent: Sep. 23, 2003

(54) SELF ROUTING INTERCONNECT CROSS-SWITCH

(75) Inventor: Benny Siman-Tov, Framingham, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/444,353

(22) Filed: Nov. 18, 1999

(51) Int. Cl.[7] .............................................. H04L 12/56
(52) U.S. Cl. ..................................... 370/389; 370/542
(58) Field of Search ................................ 370/389, 392, 370/394, 395.1, 395.2, 395.21, 395.31, 395.32, 395.3, 395.4, 395.41, 395.42, 395.43, 395.7, 395.71, 400, 412, 235, 535, 537–44, 445

(56) References Cited

U.S. PATENT DOCUMENTS

| | | | | |
|---|---|---|---|---|
| 5,475,679 A | * | 12/1995 | Munter | 370/395.4 |
| 5,936,958 A | * | 8/1999 | Soumiya et al. | 370/395.43 |
| 6,151,301 A | * | 11/2000 | Holden | 370/232 |
| 6,243,361 B1 | * | 6/2001 | McMillen et al. | 370/254 |
| 6,343,081 B1 | * | 1/2002 | Blanc et al. | 370/411 |
| 6,349,097 B1 | * | 2/2002 | Smith | 370/390 |

* cited by examiner

Primary Examiner—David Vincent
(74) Attorney, Agent, or Firm—McGlew and Tuttle, P.C.

(57) ABSTRACT

A self routing cross-switch device and method is provided with a mesh interconnect having high speed connections (e.g., connections at 10 Gbps). A plurality of input MUX elements are connected to the mesh interconnect. Each MUX element looks at a header of a frame arriving at the input MUX and configures the MUX element to route the frame though the mesh. A plurality of memory output devices are connected to the mesh interconnect. Each output device has a plurality of output first in first out (FIFO) devices for queuing frames arriving at the output memory. Each output first in first out device is associated with one input MUX. A local arbiter is provided for dequeuing frames from each output first in first out device and sending frames to an output.

28 Claims, 3 Drawing Sheets

Cross-Switch Block Diagram

Cross-Switch Block Diagram

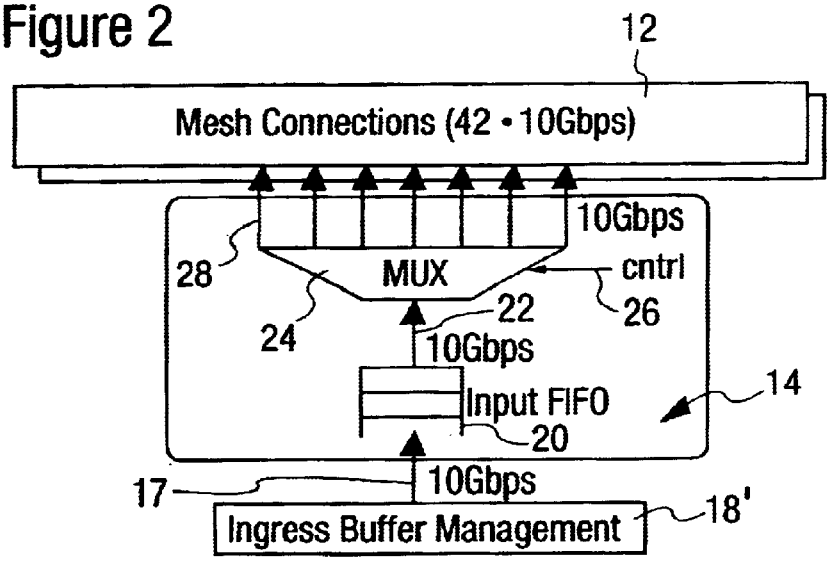
Cross-Switch Ingress Block Diagram
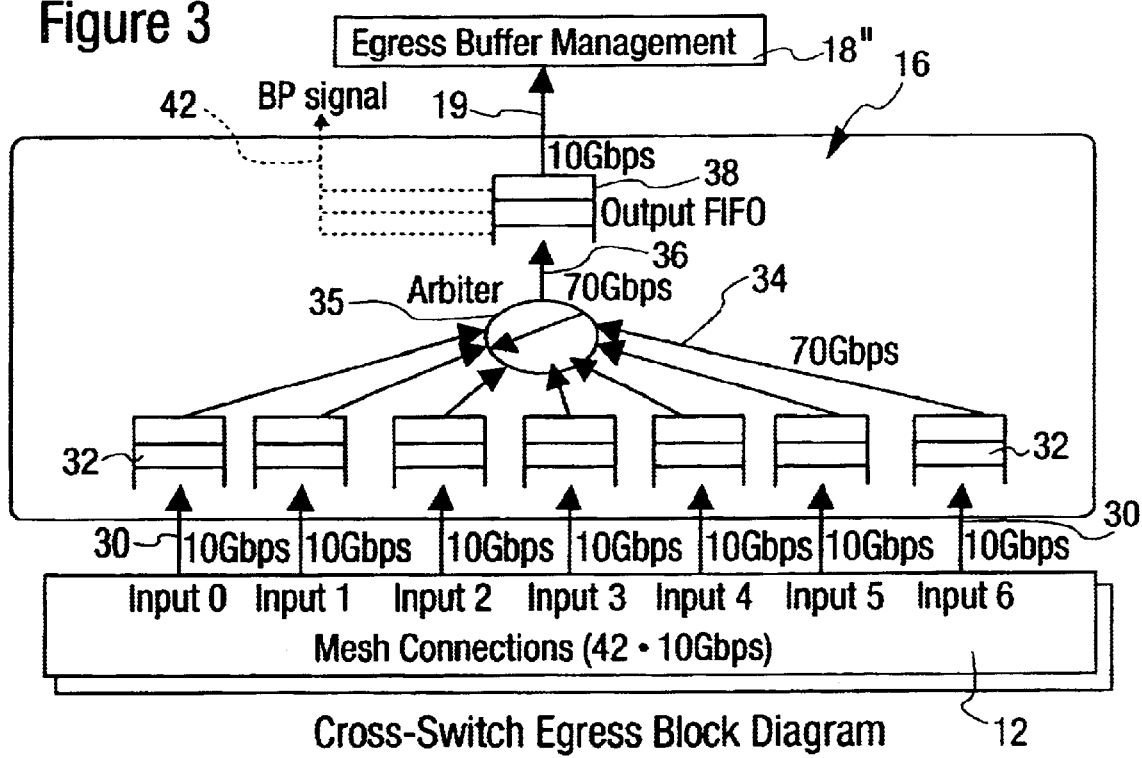
Cross-Switch Egress Block Diagram

SELF ROUTING INTERCONNECT CROSS-SWITCH

FIELD OF THE INVENTION

The invention relates generally to high-speed switches and more particularly to the use of a high-speed mesh connection to facilitate switching applications.

BACKGROUND OF THE INVENTION

Most, if not all, high-speed switches in the market today use the cross bar design. The cross bar type switch results in major limitations as to the performance of the system which uses such a switch.

A cross bar switch is an interconnect device which allows only one of the many inputs to send data to each output at a given time. When two or more inputs want to send data to the same output only one is enabled and all the others are blocked. Only one input is available to send data to each output at any given time. This inefficiency degrades the overall performance of the system and requires complex and expensive solutions to cope with the inefficiency.

One typical solution to this problem is to use a fixed cell size. Cells of a fixed size are used instead of packets. This requires each port in the system to implement segmentation and re-assembly (SAR) functions. Generally this is very expensive and difficult to implement at high speeds.

Another solution is to use over speed, meaning using a crowbar switch which supports more than the actual data rate. This is again quite expensive as the user is paying for 2× the internal bandwidth but can use only 1×.

SUMMARY AND OBJECTS OF THE INVENTION

It is an object of the invention to use a cross-switch which allows implementation of very high-speed switches with better functionality and lower-cost than cross bar based solutions.

It is another object of the invention to provide a self routing cross—switch device which allows all the inputs to send data in parallel to the same output and which avoids head of line blocking and avoids the need for expensive solutions.

It is another object of the invention to provide a self routing cross-switch which needs only a small over speed (e.g. in the range of 25 percent) and avoids head of line blocking.

It is a further object of the invention to provide a system which uses a self routing cross-switch device to allow all the inputs to send data in parallel to the same output thereby avoiding head of line blocking and avoiding the need for expensive solutions.

According to the invention, a self routing cross-switch device is provided with a mesh interconnect providing high speed connections (e.g., connections at/or above 10 Gbps). A plurality of input MUX elements are connected to the mesh interconnect. Each MUX element looks at a header of a frame arriving at the input MUX and configures the MUX element to route the frame though the mesh. A plurality of memory output devices are connected to the mesh interconnect. Each output device has a plurality of output first in first out (FIFO) devices for queuing frames arriving at the output memory. Each output first in first out device is associated with one input MUX. A local arbiter is provided for dequeuing frames from each output first in first out device and sending frames to an output.

The cross switch may be provided with pins defining various input/output portions connected to various devices. The devices may have buffer managers associated with the various input/output portions. A back pressure signal may be sent from the output memory device to the ingress buffer manager of the buffer manager unit to indicate that the first in first out (FIFO) device or the output device is above a threshold.

The mesh interconnect provides a direct inter mesh connection from each input MUX to each output block. For example, where seven input/output devices are provided, the mesh interconnect provides seven direct connections from each MUX block to each output block. In this example there are 42 mesh connections for example each running at 10 Gbps. There are a total of 49 FIFOs at the output devices. This is based on a seven by seven (7×7)cross-switch. However, features of the invention are applicable for every reasonable N X N or configuration.

The output from the mesh connections similarly may operate at 10 Gbps. The frames are removed from the FIFOs and sent at the 10 Gbps rate and forwarded to the output FIFO at the 70 Gbps rate. The egress buffer management entity of each input/output buffer manager receives data from the output FIFO at 10 Gbps. The ingress buffer manager sends frames to the input FIFO of the input device at 10 Gbps. Frames are forwarded from the input FIFO to the mux device data rate 10 Gbps.

The arbiter associated with each output block can remove frames from the FIFO based on the priority of the frame. In this way, frames of higher priority are sent to the egress buffer manager of the buffer manager unit before frames of lower priority. Where frames of equal priority are present, a round Robin selection device may be used.

The implementation according to the invention uses a cross-switch which is itself more expensive than a cross bar (the device itself). However, since the performance of the cross-switch according to the invention is much higher than the cross bar the overall cost of the system will be much lower. The cross bar will support 14.28 percent of the bandwidth in the worst-case (for a 7×7 crossbar). The cross-switch of the present invention will support 100 percent of the bandwidth in any scenario.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a block diagram showing the ingress buffer manager, the input MUX elements and the connections to the mesh interconnect;

FIG. 3 is a block diagram showing the egress buffer manager, the output memory elements and the connections to the mesh interconnect.

DESCRIPTION OF THE PREFERRED EMBODIMENT

Figure 1:
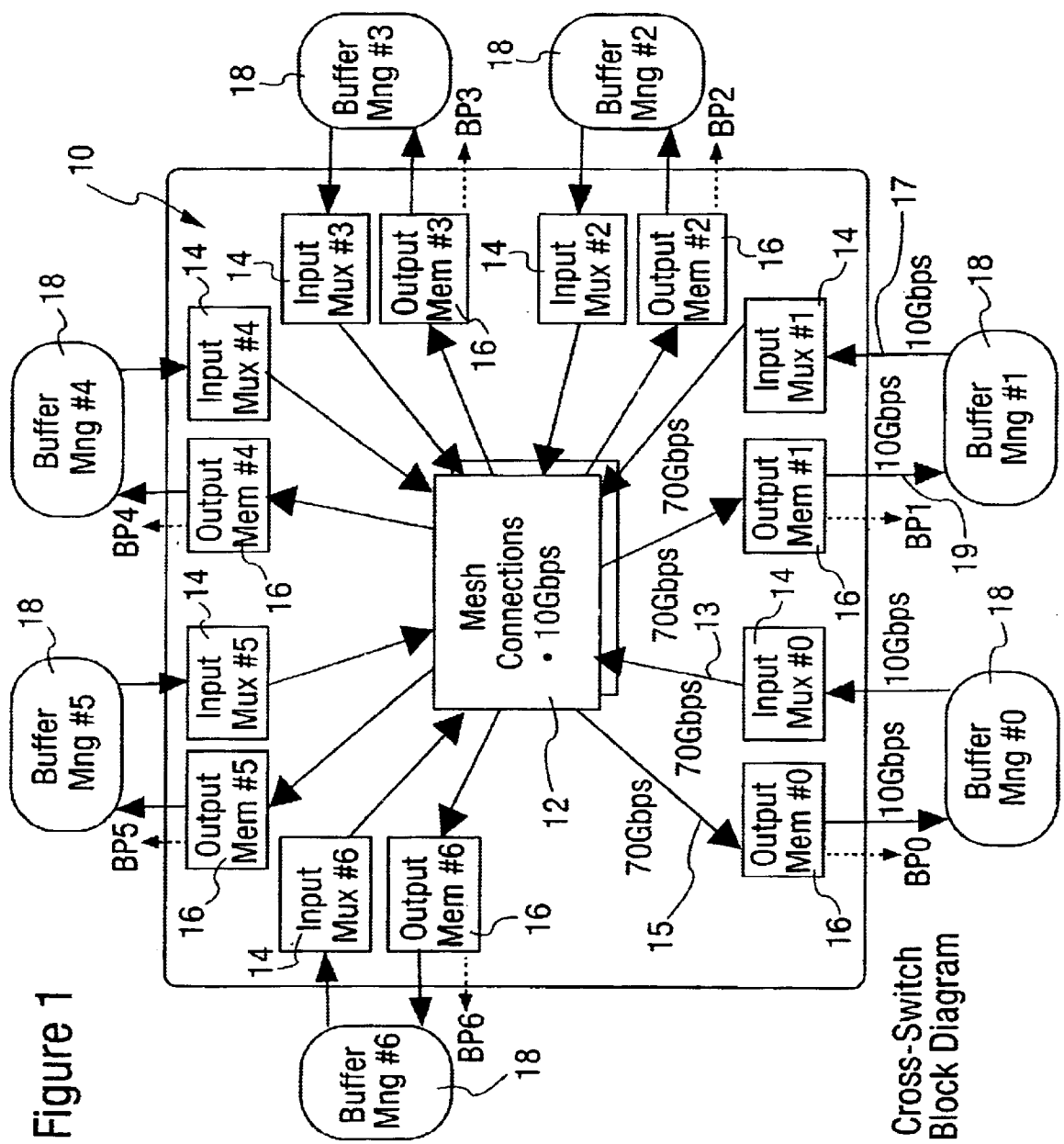
FIG. 1 is a block diagram of the cross-switch according to the invention.

Referring to the drawings in particular, the invention comprises a high-speed cross-switch generally designated 10. The cross-switch 10 includes a mesh interconnect element 12, particularly a mesh with multiple connections operating at 10 Gbps. In the example a 7×7 cross-switch is shown. However, the invention applies to every reasonable NXN configuration. The mesh interconnect element 12 (the 7×7 example)has 42 mesh connections at 10 Gbps. The mesh connections are N*(N-1)/2 where in the shown embodiment N=7 and the number of connections (half duplex) is 7*6/2=21 connections. The application uses full duplex (i.e., twice the number of connections) such that the total number of connections is 42.

The mesh has a plurality of input buses 13 and output buses 15. Each bus 13 shown in FIG. 1 represents a plurality of busses (labeled 28 in FIG. 2). Each bus 15 shown in FIG. 1 represents a plurality of busses (labeled 30 in FIG. 3). The busses 13 and 15 correspond to the connections to the input units 14 and output units 16 respectively. Each input bus 13 is connected to an input MUX unit 14. Each output bus 15 is connected to an output memory unit 16.

In the embodiment according to the invention seven different transmitting and receiving units or forwarding units are connected to the cross-switch 10 for sending signals via the switch 10 to any one of the other transmitting and receiving units or forwarding units. Each of the transmitting and receiving units is connected to a buffer management unit 18. Each buffer management unit 18 has a 10 Gbps connection 17 to the input mux unit 14. Each buffer management unit 18 also has a 10 Gbps connection 19 from the output memory unit 16.

The forwarding devices or transmitting and receiving units transmit frames which are received at buffer managers 18. These frames are packets with a header indicating the destination, e.g. which connected unit the frame is destined to be received at, as well as the class of the frame. The frame is sent to the mesh connection 12 via the input mux 14. The input mux 14 has seven different connections traveling via the mesh connection 12 to each one of the various output memory units 16. The input mux unit 14 switches the packet to one or more of the mesh connections.

Each of the memory devices 16 has 7 different connections to the mesh, namely to seven different input mux units 14.

As can be seen FIG. 2 the cross-switch ingress portion includes the data ingress buffer manager 18' to connected by the 10 Gbps connection 17 to the input MUX unit 14. Packets or frames which are sent from the ingress buffer manager 18' have inband data pre-pended to the packet. The pre-pending of data to the packet may be done in one embodiment by the transmitting receiving units or forwarding devices. The pre-pended data is part of a header generated by the transmitting and receiving unit or forwarding device and indicates the destination such as the slot of the destination receiving unit or forwarding device, namely where the frame or packet is destined for. Additionally, the prepended data or header includes class data to indicate the priority of the frame and to indicate where the fame belongs.

The input MUX unit 14 includes an input FIFO 20 which receives the frames from the ingress buffer manager 18' via the connection 17. The frames are then passed via 10 Gbps connection 22 to the MUX elements 24. The MUX element 24 is a switching device which reads the packet header and based on this the MUX element is controlled at 26 for switching the packet to one of seven destinations of buses 28. Buses 28 connect the input MUX unit 14 with the mesh connection 12. In the case of unicast, only one of the busses 28 is active. The throughput is only 10 Gbps. However; with multicast all 7 buses 28 are active at the same time such that the throughput is 70 Gbps based on the bandwidth of all seven busses 28. As each frame arrives to the input MUX element, the input MUX element looks at its header and configures the MUX to route the frame to the right destination bus 28. The destination busses 28 each connect through the mesh to one of the particular output memory units 16. Each frame may have a single destination or may also have multiple destinations (multicast). With the features of the invention there is no need for an external arbiter to make routing decisions. Instead, this is done internally to the cross-switch. The switch functions based on the self routing information which is pre-pended to the frame.

FIG. 3 shows the cross-switch egress portion including the mesh interconnect 12 with seven different output connections 30, each output connection being a parallel connection to one of the various input MUX units 14. The connections 30 transfer frames e.g., at 10 Gbps. The output memory unit 16 includes seven FIFOs 32 for receiving frames from the seven input connections 30. The incoming frames are queued to its FIFO 32.

A local arbiter 35 chooses one of the seven FIFOs 32 to dequeue a frame via connections 34 and 36. The FIFOs 32 are rate matching FIFO's. They are small and and used for receiving data at 10 Gbps speed from the mesh connection 12 and transmitting data to the output FIFO 38 at 70 Gbps. The frame is sent to the output FIFO 38 and then via connection 40 to the egress buffer manager 18". A back pressure signal is sent to the ingress blade if the FIFO 38 is above a threshold via back pressure line 42. The back pressure line 42 is provided for each output memory unit 16.

Figure 4:
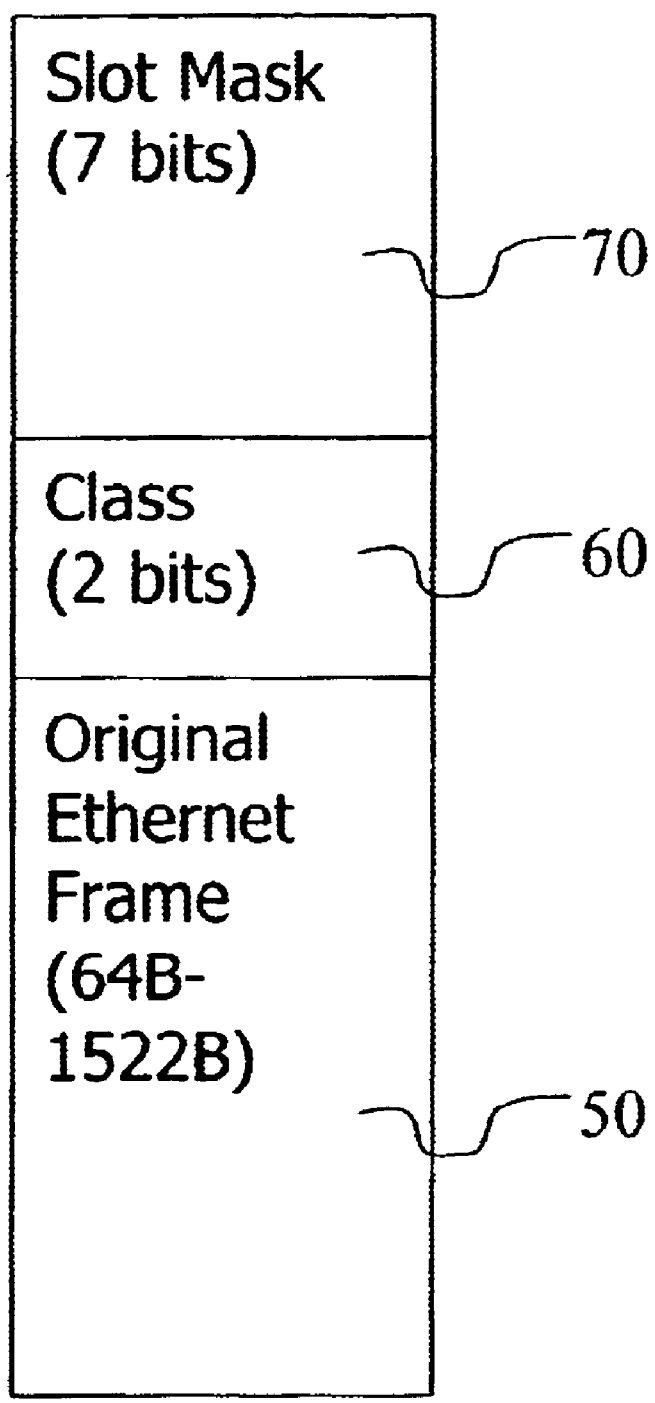
FIG. 4 is a diagram showing a packet with a header.

FIG. 4 shows a diagram of a packet with header. The header includes the information which is pre-pended to the packet by the transmitting device. The original Ethernet frame 50, e.g., 64B to 1522 Bits, is received from the connected wire. The pre-pended class header part 60 is e.g., 2 bits representing 4 priority classes used by the egress arbiter 35. The pre-pended Slot Mask header part 70 is e.g., 7 bits. These 7 bits each preset a destination port (or slot). The destination information is used by the ingress MUX control 24. This is a simple example with an L1 overhead of 9 bits, which are added to every frame. In normal applications, the L1 will be much bigger based on other information needed by the egress management 18" (but not needed by the cross switch).

Using features of the invention makes it possible to provide a cross-switch which allows implementation of very high-speed switching with better functionality and lower-cost than cross bar based solutions.

While a specific embodiment of the invention has been shown and described in detail to illustrate the application of the principles of the invention, it will be understood that the invention may be embodied otherwise without departing from such principles.

What is claimed is:

1. A self routing cross-switch device comprising:
 a mesh interconnect providing high speed connections between a plurality input mesh connections and a plurality of output mesh connections;
 a plurality of input elements, each of said input elements including a switching element connected to said plurality of input mesh connections of said mesh interconnect, said switching element looking at a header of a frame arriving at the input element and configuring the switching element to route the frame though the mesh interconnect via one or more of said input mesh connections;

a plurality of output elements connected to said mesh interconnect, each output element being connected to each said input element through said mesh via a respective input mesh connection, each of said output elements having a plurality of output first in first out (FIFO) devices for queuing frames arriving at the output element, each output first in first out device being associated with a separate one of said input elements;

a local arbiter for dequeuing frames from each output first in first out device and sending frames to an output.

2. The self routing cross-switch device according to claim 1, wherein:

the cross-switch is provided with pins defining various input/output portions connected to various devices.

3. The self routing cross-switch device according to claim 2, wherein:

said devices each are associated with a buffer manager, each buffer manager being associated with one of said input/output portions.

4. The self routing cross-switch device according to claim 3, wherein:

said mesh interconnect includes back pressure connections from each input element to an associated buffer manager, each input device sending a signal to an ingress buffer manager portion of an associated buffer manager to indicate that the first in first out (FIFO) device of the output element is above a threshold.

5. The self routing cross-switch device according to claim 1, wherein:

said mesh interconnect provides a direct connection from each input element to each output element.

6. The self routing cross-switch device according to claim 1, wherein:

seven input/output devices are provided, and said mesh interconnect provides seven direct connections from each switch of and associated input element to the first in first out (FIFO) device of an output element.

7. The self routing cross-switch device according to claim 6, wherein:

the cross-switch is a seven by seven (7×7)cross-switch with 42 mesh connections provided by said mesh interconnect each running at 10 Gbps with a total of 49 FIFOs at the output elements.

8. The self routing cross-switch device according to claim 1, wherein:

said output element further comprises an output FIFO receiving frames based on said dequeuing by said local arbiter.

9. The self routing cross-switch device according to claim 8, wherein:

the cross-switch is provided with input/output portions connected to various devices, said devices each being associated with a buffer manager, each buffer manager being associated with one of said input/output portions, said mesh interconnect including back pressure connections from each input element to an associated buffer manager, each input device sending a signal to an ingress buffer manager portion of an associated buffer manager to indicate that the output first in first out (FIFO) device of the output element is above a threshold.

10. The self routing cross-switch device according to claim 9, wherein:

frames are removed from the FIFOs and sent at the 10 Gbps rate and forwarded to said output FIFO at the 70 Gbps rate.

11. The self routing cross-switch device according to claim 1, wherein:

said local arbiter removes frames from the FIFO based on the priority of the frame with frames of higher priority sent to be the egress buffer manager of the buffer manager unit before frames of lower priority, the priority being indicated in the header of the frame.

12. The self routing cross-switch device according to claim 11, wherein:

frames of equal priority are removed from the FIFO with a round robin selection.

13. A self routing cross-switch device comprising:

a plurality of input MUX devices;

a mesh interconnect, each of said input MUX devices being connected to said mesh interconnect;

a plurality of output memory devices connected to said mesh interconnect each out memory including a plurality of first in first out devices for queuing frames arriving at the output memory device, each output memory having one said first in first out device associated with each said input MUX; and a local arbiter for dequeuing frames from each said output first in first out device.

14. A self routing cross-switch method comprising the steps of:

providing a mesh interconnect having high speed connections between a plurality of input mesh connections and a plurality of output mesh connections;

providing a plurality of input elements, each of said input elements including a switching element connected to a plurality of input mesh connections of said mesh interconnect;

providing a plurality of output elements connected to said mesh interconnect, each output element being connected to each input element through said mesh via a respective input mesh connection, each of said output devices having a plurality of output first in first out (FIFO), each output first in first out device being associated with one of said input elements;

transmitting data frames to one of said input elements, said data frames having a header;

looking at a header of a frame arriving at the input element and configuring the switching element to route the frame though the mesh via one or more of said input mesh connections;

dequeuing frames arriving at the output element FIFO with a local arbiter and sending frames to a cross-switch output.

15. The self routing cross-switch method according to claim 14, wherein:

the cross switch is provided with input/output portions connected to various devices, said devices each being associated with a buffer manager, each buffer manager being associated with one of said input/output portions, said mesh interconnect including back pressure connections from each input element to an associated buffer manager, each input device sending a signal to an ingress buffer manager portion of an associated buffer manager to indicate that the output first in first out (FIFO) device of the output element is above a threshold.

16. The self routing cross-switch method according to claim 14, wherein:

said mesh interconnect provides a direct connection from each input element to each output element.

17. The self routing cross-switch method according to claim 14, wherein:

said output element is further provided with an output FIFO and receives frames based on said dequeuing by said local arbiter.

18. The self routing cross-switch device according to claim 17, wherein:

the cross-switch is provided with input/output portions connected to various devices, said devices each being associated with a buffer manager, each buffer manager being associated with one of said input/output portions, said mesh interconnect including back pressure connections from each input element to an associated buffer manager, each input device sending a signal to an ingress buffer manager portion of an associated buffer manager to indicate that the output first in first out (FIFO) device of the output element is above a threshold.

19. The self routing cross-switch method according to claim 18, wherein:

frames are removed from the FIFOs and sent at the 10 Gbps rate and forwarded to said output FIFO at the 70 Gbps rate.

20. The self routing cross-switch device according to claim 14, wherein:

said local arbiter removes frames from the FIFO based on the priority of the frame with frames of higher priority sent to be the egress buffer manager of the buffer manager unit before frames of lower priority, the priority being indicated in the header of the frame.

21. The self routing cross-switch device according to claim 20, wherein:

frames of equal priority are removed from the FIFO with a round robin selection.

22. A device in accordance with claim 1, wherein:

said switch elements selectively route the frame along separate said high speed connections between said input and output mesh connections;

said plurality of high speed connections are arranged to have all of said plurality of input mesh connections send data in parallel to each of said output mesh connections.

23. A device in accordance with claim 13, wherein:

said plurality of input MUX devices selectively route the frames along separate inter mesh connections of said mesh interconnect;

said inter mesh connections are direct connections between each said input MUX device and each said output memory devices;

said inter mesh connections are arranged to have all of said input MUX devices send data in parallel to each of said output memory devices.

24. A method in accordance with claim 14, wherein:

said switch elements selectively route the frames along separate said high speed connections between said input and output mesh connections;

said high speed connections are direct connections between each said input mesh connection and each said output mesh connection;

said plurality of high speed connections are arranged to have all of said plurality input mesh connections send data in parallel to each of said output mesh connections.

25. A self routing cross-switch device for frames, the device compromising:

a mesh interconnect including a plurality of input connections and a plurality of output connections, said mesh interconnect including a plurality of inter mesh connections between said plurality of input connections and said plurality of output connections;

a plurality of input elements, each of said input elements including a switching element connected to said plurality of input connections, each said switching element being examinable of a header of one of the frames arriving at a respective said input element and configureable of said switching element to route the one frame though said mesh interconnect via one or more of said inter mesh connections;

a plurality of output elements connected to said mesh interconnect, each output element being connected to each input element through said mesh via a respective inter mesh connection, each of said output elements having a plurality of receiving FIFO devices for separately queuing frames received at said each output element from separate said input elements;

a local arbiter in each said output element for dequeuing the frames from each said receiving FIFO device and sending the frames out of the cross-switch device.

26. A device in accordance with claim 25, wherein:

said switch elements selectively route the one frame along separate said inter mesh connections.

27. A device in accordance with claim 25, wherein:

said plurality of inter mesh connections are direct connections between each said input connection and each said output connection.

28. A method in accordance with claim 25, wherein:

said plurality of inter mesh connections are arranged to have all of said plurality of input connections send data in parallel to each of said output connections.

* * * * *